US005992992A

United States Patent [19]

Gibson

[11] Patent Number: 5,992,992

[45] Date of Patent: Nov. 30, 1999

[54] PRESSURE CONTROL DEVICE FOR AN INK JET PRINTER

[75] Inventor: Bruce David Gibson, Lexington, Ky.

[73] Assignee: Lexmark International, Inc., Lexington, Ky.

[21] Appl. No.: 09/096,125

[22] Filed: Jun. 11, 1998

[51] Int. Cl.[6] .............................. B41J 2/17; F16K 31/12

[52] U.S. Cl. .............................. 347/94; 134/500

[58] Field of Search .............................. 347/84, 85, 86, 347/87, 94, 17; 137/500

[56] References Cited

U.S. PATENT DOCUMENTS

| | | | |
|---|---|---|---|
| 4,270,133 | 5/1981 | Shimazawa et al. | 347/7 |
| 4,677,447 | 6/1987 | Nielsen | 347/87 |
| 5,039,999 | 8/1991 | Winslow et al. | 347/87 |
| 5,270,739 | 12/1993 | Kitani et al. | 347/87 |
| 5,426,459 | 6/1995 | Kaplinsky | 347/87 |
| 5,479,198 | 12/1995 | Kawano et al. | 347/86 |
| 5,505,339 | 4/1996 | Cowger et al. | 222/105 |
| 5,515,092 | 5/1996 | Swanson et al. | 347/87 |
| 5,519,425 | 5/1996 | Dietl et al. | 347/87 |
| 5,537,136 | 7/1996 | Brandon et al. | 347/87 |
| 5,555,007 | 9/1996 | Ceschin et al. | 347/87 |
| 5,594,483 | 1/1997 | Kaplinsky et al. | 347/87 |
| 5,600,358 | 2/1997 | Baldwin et al. | 347/87 |
| 5,608,437 | 3/1997 | Iwata et al. | 347/86 |

*Primary Examiner*—N. Le
*Assistant Examiner*—Michael Nghiem
*Attorney, Agent, or Firm*—John A. Brady

[57] ABSTRACT

A tower chamber of a thermal ink jet cartridge has an ink reservoir communicate therewith through a first passage, which is controlled by a spring biased valve. Ink exits from the tower chamber to nozzles in a printhead chip through a second passage. The valve has a pressure compliant bladder attached to its bottom surface in sealing relation therewith. A passage extends through the valve to provide continuous communication between the interior of the bladder and the reservoir. The bladder is formed of a material to continuously urge it to its relaxed state. When the back pressure in the tower chamber increases, ink flows into the bladder to expand it to fill the volume of the tower chamber. If an air bubble is trapped within the tower chamber, it will expand or shrink when subjected to a pressure variation and/or a temperature variation. The bladder will expand to fill the volume in the tower chamber when the air bubble shrinks and will contract when the air bubble expands so that the tower chamber accommodates the increased volume of the air bubble. The valve does not open to allow ink to flow into the tower chamber from the reservoir until after the bladder is fully expanded.

16 Claims, 2 Drawing Sheets

PRESSURE CONTROL DEVICE FOR AN INK JET PRINTER

FIELD OF THE INVENTION

This invention relates to an ink jet cartridge and, more particularly, to an ink jet cartridge having a pressure control device.

BACKGROUND OF THE INVENTION

It has previously been suggested to use a spring loaded bladder as an ink reservoir or a foam filled ink reservoir for a portable or disposable thermal ink jet cartridge to contain the ink during both shipping and use. Both the spring loaded bladders and the foam filled reservoirs have not had a high volume efficiency because of the back pressure mechanism that each has contained.

Neither arrangement has been easily refilled. The spring loaded bladder has been sealed and maintained at a negative pressure so that any refilling of the bladder has been difficult since it is necessary for the bladder to continue to have the negative pressure therein.

In a foam filled reservoir, as the ink is used, air pockets form in the ink and the foam surfaces de-wet. The foam can be refilled and used multiple times, but the number of air pockets in the foam increases with each refilling so that the foam eventually cannot be refilled.

It has previously been suggested in U.S. Pat. No. 4,677,447 to Nielsen to employ a check valve to contain the ink during shipping as well as use. The check valve allows ink to flow from the reservoir into a small cavity adjacent nozzles of a thermal ink jet printhead and from which the ink flows into the nozzles. The check valve has been preloaded to establish a valve opening pressure in excess of the hydrostatic pressure resulting at least from the maximum depth of ink in the reservoir. The check valve prevents depriming of the small cavity so that neither the introduction of foam in the reservoir nor the use of a spring loaded elastic bladder as the reservoir is necessary to prevent leakage through the nozzles by gravity.

However, the check valve of the aforesaid Nielsen Patent is not capable of preventing air bubbles, which are trapped within the small cavity and expand and contract due to pressure and/or temperature variations, from pumping ink out of the small cavity of the aforesaid Nielsen Patent. Thus, ink leakage could occur through the nozzles by an expanding and contracting air bubble pumping ink out of the small cavity to the nozzles.

If the check valve of the aforesaid Nielsen Patent should allow too much ink to flow into the small cavity, the pressure would increase in the small cavity so that there would be leakage of the ink through the nozzles. Therefore, the check valve of the aforesaid Nielsen Patent does not satisfactorily solve all of the problems causing ink leakage.

SUMMARY OF THE INVENTION

The foregoing problems created by using only a check valve to control ink flow from the ink reservoir are satisfactorily overcome by a pressure control device of the present invention. The pressure control device has a valve, which is preferably resiliently biased, and a compliant volume control arrangement, which is preferably a pressure compliant bladder, compensating for changes in the volume of a tower chamber. In the preferred embodiment, the bladder communicates with the ink reservoir to receive its internal pressure. Alternatively, it may communicate by a separate conduit to the atmosphere or to some other suitable pressure source.

The valve controls ink flow from the ink reservoir to the tower chamber in accordance with the back pressure in the tower chamber. The tower chamber is adjacent the nozzles and supplies ink therefrom to nozzles adjacent thereto.

The tower chamber has a relatively small volume in comparison with the ink reservoir. However, the volume of the tower chamber is large enough to contain air bubbles and ink but not so small as to impede ink flow to the nozzles in the presence of air bubbles. If the volume of the tower chamber is too large, ink usage efficiency is reduced since print quality is not satisfactory when the reservoir is dry even though the tower chamber is full.

When the ink volume of the tower chamber changes due to a pressure variation and/or a temperature variation with an air bubble trapped in the tower chamber, the size of the air bubble will change. The complying volume control arrangement prevents the air bubbles from pumping ink out of the tower chamber.

The complying volume control arrangement of the present invention also is effective if too much ink is supplied to the tower chamber so that the pressure in the tower chamber would increase to cause ink leakage. However, the pressure compliant bladder prevents this through contracting.

The valve of the present invention allows ink to flow into the tower chamber from the ink reservoir when the pressure in the tower chamber equals that of the force required to overcome the force urging the valve to its closed position. When the back pressure in the tower chamber increases, the compliant volume control arrangement becomes effective. The force of the pressure compliant bladder is maximized in that its volume is increased to a maximum before the valve opens.

As previously mentioned, the compliant volume control arrangement compensates for changes due to pressure or temperature with an air bubble trapped in the tower chamber. As the air bubble shrinks, the pressure compliant bladder expands to increase its volume in the tower chamber so that the valve will not momentarily open.

If the air bubble increases in size, the pressure compliant bladder contracts to reduce the volume that the bladder is occupying in the tower chamber. This avoids the tower chamber from having its pressure increased by the increasing volume of the air bubble so that ink is not pressed out through the nozzles by the increasing volume of the air bubble.

Because the tower chamber has a relatively small total volume in comparison to the ink reservoir, most of the ink in the reservoir is used. This provides a high volumetric efficiency.

Furthermore, when the ink reservoir is at atmospheric pressure and not sealed as is required by a spring loaded bladder, additional ink may be easily added to the bladder without loss of the back pressure in the tower chamber or the loss of prime in the tower chamber.

An object of this invention is to provide a pressure control device for an ink jet cartridge in which there is compliant volume compensation.

Other objects of this invention will be readily perceived from the following description, claims, and drawings.

BRIEF DESCRIPTION OF THE DRAWINGS

The attached drawings illustrate a preferred embodiment of the invention, in which.

DETAILED DESCRIPTION OF PREFERRED EMBODIMENT

Figure 1:
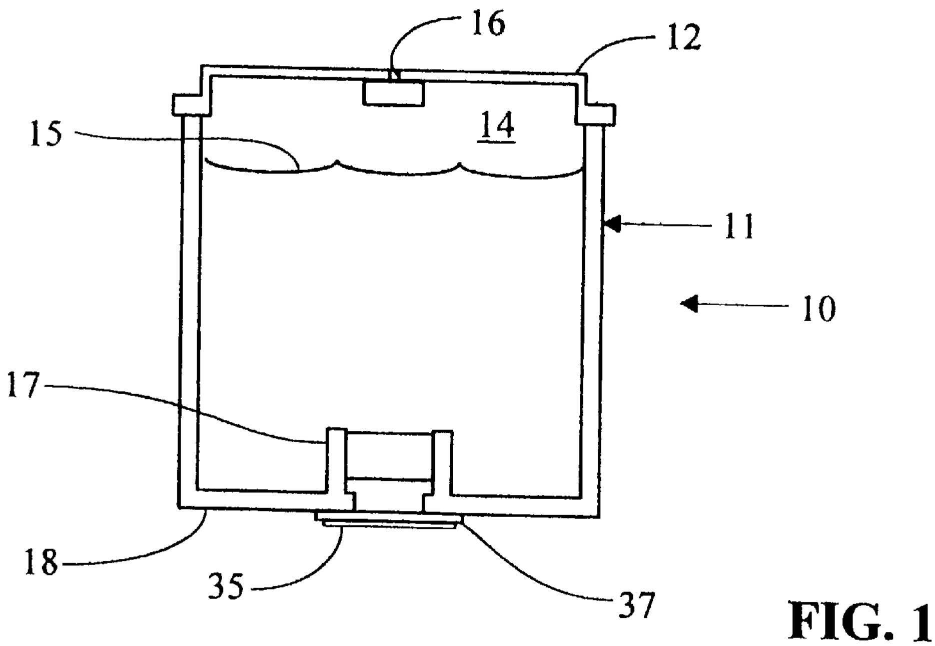
FIG. 1 is a schematic view of a thermal ink jet cartridge having a pressure control device of the present invention.

Referring to the drawings and particularly FIG. 1, there is shown a thermal ink jet cartridge 10 including a plastic body 11. The body 11 has a plastic lid 12 cooperating therewith to form a reservoir 14 for ink 15. The lid 12 has a hydrophobic air vent 16 to prevent loss of water from the ink 15 in the reservoir 14 while allowing air to vent from the reservoir 14. Thus, the reservoir 14 is at atmospheric pressure.

Figure 2:
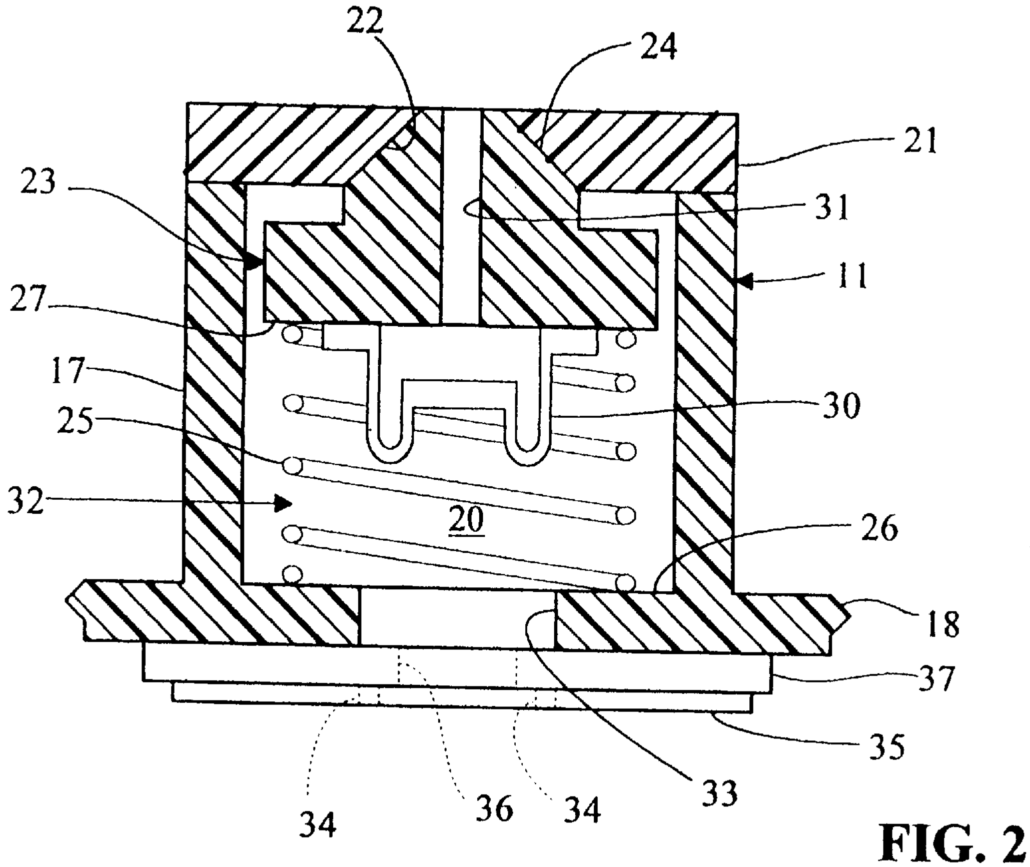
FIG. 2 is a fragmentary sectional view of the pressure control device with its valve in its closed position and its pressure compliant bladder in its relaxed state.

A tower or standpipe 17 extends upwardly from a bottom wall 18 of the body 11. One purpose of the tower 17 is to physically support a filter (not shown) for final removal of particles in the ink 15 prior to printing. As shown in FIG. 2, the tower 17 has a chamber or cavity 20 therein between the bottom wall 18 of the body 11 and a plastic seal ring 21 at the top of the tower 17. The tower chamber 20 has a very small volume in comparison with the ink reservoir 14 (see FIG. 1).

The tower chamber 20 (see FIG. 2) communicates with the reservoir 14 (see FIG. 1) through a converging passage 22 (see FIG. 2) in the seal ring 21. A plastic valve body 23, which is disposed in the tower chamber 20, has a tapered portion 24 cooperating with the converging passage 22 in the seal ring 21 to control ink flow from the reservoir 14 (see FIG. 1) to the chamber 20 (see FIG. 2) in the tower 17. One of the seal ring 21 and the valve body 23 has a sealing element (not shown), which can be rubber, to seal against the other.

Figure 3:
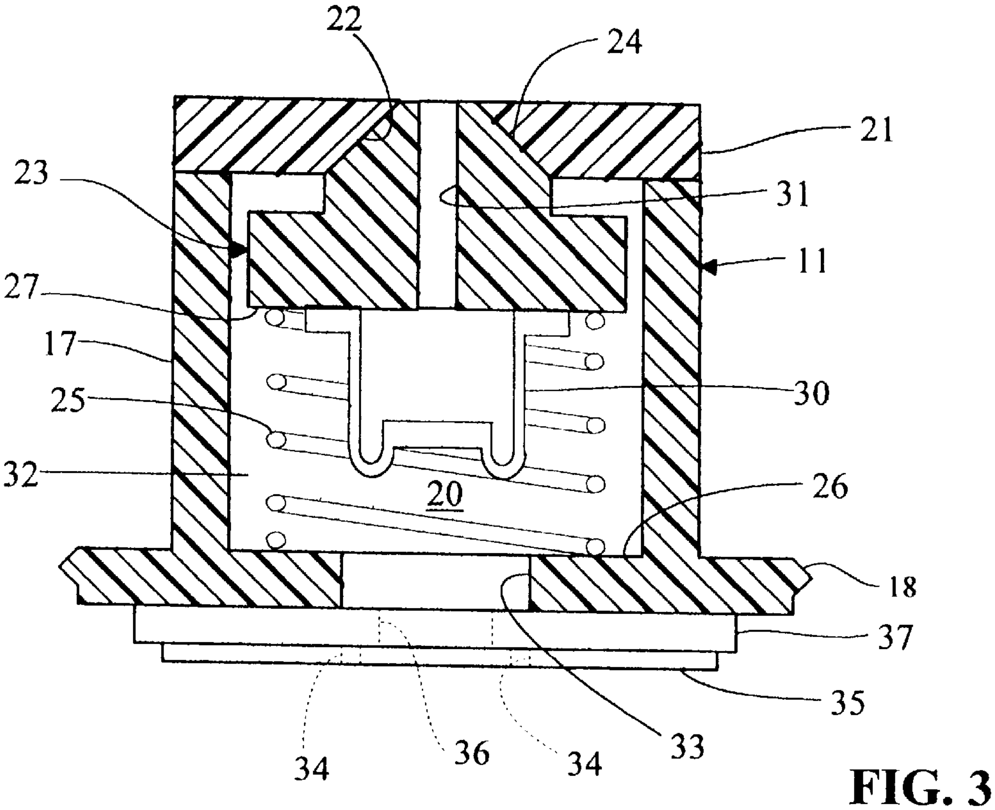
FIG. 3 is a fragmentary sectional view of the pressure control device of FIG. 2 with its valve in its closed position but with its pressure compliant bladder in its extended state.

The tower chamber 20 has a coil spring 25 therein continuously urging the valve body 23 to its closed position of FIGS. 2 and 3 in which ink flow through the passage 22 is blocked by the tapered portion 24 of the valve body 23. The coil spring 25 acts between an upper surface 26 of the bottom wall 18 and a bottom surface 27 of the valve body 23.

A pressure compliant bladder 30 is attached to the bottom surface 27 of the valve body 23 in sealing relation therewith. The interior of the bladder 30 continuously communicates through a passage 31 in the valve body 23 with the ink reservoir 14 (see FIG. 1), which has the hydrostatic pressure of the ink 15 therein provide a pressure source for the interior of the bladder 30 (see FIG. 2), so that the ink 15 (see FIG. 1) may flow into or out of the interior of the bladder 30 (see FIG. 2) in accordance with the back pressure in the tower chamber 20.

The bladder 30 is formed of an elastomeric material having the capability of being continuously urged to its relaxed state of FIG. 2. The elastomeric material of the bladder 30 also must be ink resistant. Two suitable examples of the elastomeric material of the bladder 30 are a molded silicone and a molded ethylene propylene diene monomer.

The valve body 23, the spring 25, and the bladder 30 constitute a pressure control device 32. The pressure control device 32 is responsive to the back pressure in the tower chamber 20 for controlling when the valve body 23 allows the ink 15 (see FIG. 1) to flow from the reservoir 14 into the tower chamber 20 (see FIG. 2). The resilience of bladder 30 is sufficiently strong so as not to develop a positive pressure in chamber 20 even when it is full of ink 15 or being refilled to resupply ink 15.

The tower chamber 20 continuously communicates through a passage 33 in the bottom wall 18 of the body 11 with nozzles 34 in a nozzle plate 35 by a via hole 36 in a printhead chip 37. Thus, the ink 15 (see FIG. 1) flows from the tower chamber 20 (see FIG. 2) through the passage 33 into the nozzles 34 selected for printing in the well-known manner. That is, a resistor heater (not shown) heats the ink 15 (see FIG. 1) to produce droplets in the selected nozzles 34 (see FIG. 2).

When the ink 15 (see FIG. 1) flows from the tower chamber 20 (see FIG. 2) into the nozzles 34, the pressure compliant bladder 30 expands from its relaxed state of FIG. 2 to its expanded state of FIG. 3. This occurs because the ink 15 (see FIG. 1) in the reservoir 14 flows into the interior of the bladder 30 (see FIG. 3) through the passage 31 in the valve body 23 since the bladder 30 can expand due to a lesser volume of the noncompressible ink 15 (see FIG. 1) being within the tower chamber 20 is (see FIG. 2).

After the bladder 30 has reached its fully expanded condition of FIG. 3 and this expansion does not occupy the entire volume in the tower chamber 20 created by the removed ink 15 (see FIG. 1), the back pressure in the tower chamber 20 (see FIG. 2) becomes more negative. This increased negative pressure in the tower chamber 20 enables the hydrostatic pressure of the ink 15 (see FIG. 1) in the reservoir 14 to move the valve body 23 (see FIG. 4) to the position of FIG. 4. This allows the ink 15 (see FIG. 1) to flow through the passage 22 (see FIG. 4) into the tower chamber 20.

When the tower chamber 20 has a sufficient volume of the ink 15 (see FIG. 1) flow thereinto from the reservoir 14 so that the back pressure within the tower chamber 20 (see FIG. 2) decreases, the force of the spring 25 returns the valve body 23 to its closed position of FIG. 3. Thus, the bladder 30 is always in its maximum extended state of FIG. 3 before the valve body 23 moves to its open position of FIG. 4.

If the ink 15 (see FIG. 1) within the tower chamber 20 (see FIG. 2) has its volume changed due to a change in temperature or pressure, the bladder 30 will compensate for this. This is particularly applicable when an air bubble is trapped within the tower chamber 20.

With an air bubble trapped within the tower chamber 20 and decreasing in size, the bladder 30 expands from its relaxed state of FIG. 2 towards its fully extended position of FIG. 3. The amount of expansion depends on the volume within the tower chamber 20 for which there is to be compensation because of the presence of the air bubble.

If the air bubble increases in size, the bladder 30 contracts and the ink 15 (see FIG. 1) flows from the interior of the bladder 30 (see FIG. 2) through the passage 31 in the valve body 23 to the reservoir 14 (see FIG. 1). This reduction in the volume of the bladder 30 (see FIG. 2) within the tower chamber 20 avoids the air bubble pushing the ink 15 (see FIG. 1) out of the tower chamber 20 (see FIG. 2) through the nozzles 34 whereby there would be leakage of the ink 15 (see FIG. 1) through the nozzles 34 (see FIG. 3).

While the bladder 30 has been shown and described as continuously communicating through the passage 31 in the valve body 23 with the reservoir 14 (see FIG. 1), it should be understood that the bladder 30 (see FIG. 2) could be mounted on a wall of the chamber 20 and communicate therethrough with the reservoir 14 (see FIG. 1). It also should be understood that the interior of the bladder 30 (see FIG. 2) could continuously communicate with the atmosphere rather than the reservoir 14 (see FIG. 1), if desired, so the atmosphere would be the pressure source for the interior of the bladder 30 (see FIG. 2).

Figure 4:
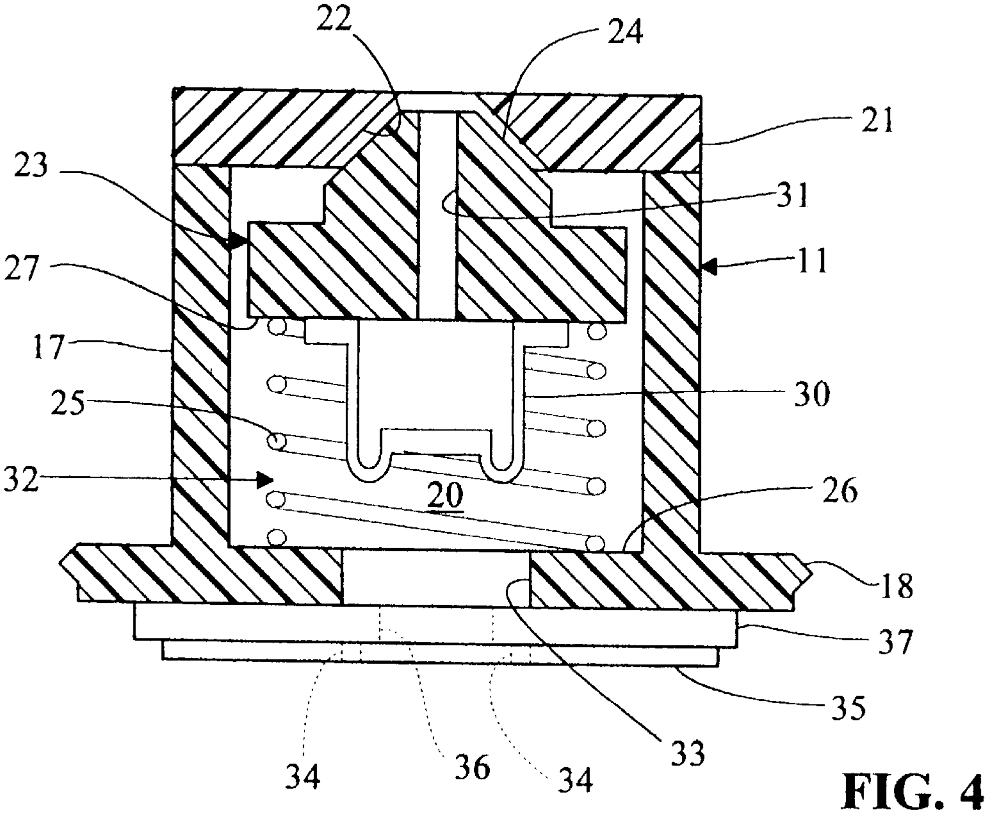
FIG. 4 is a fragmentary sectional view of the pressure control device of FIG. 2 with its valve in its open position.

While the bladder 30 is the preferred structure for changing the compliant volume within the tower chamber 20, it should be understood that other suitable structures may be employed to change the compliant volume within the tower chamber 20. For example, a spring loaded valve can be utilized. It should be understood that the force required to move the valve body 23 to its open position of FIG. 4 is greater than the force on the spring loaded valve in the same manner that it is greater than the force to expand the bladder 30.

It should be understood that the chamber 20 in the tower 17 accumulates air during printing. The pressure control device 32 accommodates this air. Without this accommodation of the air, the air would act as a pump when there were substantial changes in temperature and/or pressure, for example.

Because of the pressure control device 32, ink leakage from the reservoir 14 (see FIG. 1) through the nozzles 34 (see FIG. 2) is avoided. Accordingly, it is not necessary to use foam within the reservoir 14 (see FIG. 1) or a spring loaded bladder as the reservoir to prevent ink leakage.

While the pressure control device 32 (see FIG. 2) has been shown and described as being used in the tower chamber 20, it should be understood that it may be used with any small chamber or cavity through which ink is supplied to nozzles.

While the present invention has been shown and described for use with a thermal ink jet printer, it should be understood that it may be used with other ink jet printers. One example would be a piezoelectric ink jet printer.

An advantage of this invention is that it maintains the ink within a tower chamber at a proper back pressure to keep the ink from leaking through the nozzles and to prevent air bubbles from entering the reservoir. Another advantage of this invention is that it enables almost complete usage of the ink in a cartridge. A further advantage of this invention is that ink may be added to the reservoir without loss of the back pressure.

For purposes of exemplification, a preferred embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. An ink jet cartridge including:

a body having an ink reservoir therein, wherein ink in said ink reservoir produces pressure;

said body including a tower;

said tower having a chamber therein having a volume for containing ink wherein ink in said volume of said chamber produces pressure;

said tower having a first passage for communicating said chamber with said ink reservoir;

flow control means for said first passage for controlling ink flow from said ink reservoir by opening and closing said first passage into said chamber in response to said pressure of ink in said volume of said chamber;

a pressure compliant body disposed in said chamber, said pressure compliant body being within said chamber and tending to contract to a minimum volume condition, said pressure compliant body continuously communicating with said ink reservoir to expand said pressure compliant body to reduce volume of said chamber to contain ink or to enable said pressure compliant body to return towards said minimum volume condition to increase volume of said chamber to contain ink in response to said pressure of ink in said volume of said chamber;

nozzles disposed adjacent said tower through which ink is selectively ejected;

and said chamber having a second passage communicating said chamber with said nozzles for ink to flow from said chamber to said nozzles.

2. The cartridge according to claim 1 in which:

said flow control means includes:

a valve body;

and means for continuously urging said valve body to a closed position to block said first passage to prevent ink flow from said ink reservoir through said first passage into said chamber;

and said valve body supports said pressure compliant body.

3. The cartridge according to claim 2 in which:

said pressure compliant body is a pressure compliant bladder having the capability of continuously returning to said minimum volume condition;

and said valve body has a passage communicating the interior of said pressure compliant bladder with said ink reservoir so that ink flows to said pressure compliant bladder from said ink reservoir or to said ink reservoir from said pressure compliant bladder in response to pressure of ink in said volume of said chamber.

4. The cartridge according to claim 3 in which said means for continuously urging of said flow control means comprises a spring.

5. The cartridge according to claim 2 in which said means for continuously urging of said flow control means comprises a spring.

6. The cartridge according to claim 1 in which said flow control means supports said pressure compliant body.

7. The cartridge according to claim 6 in which said pressure compliant body is a pressure compliant bladder having an interior continuously communicating with said ink reservoir so that ink flows to said pressure compliant bladder from said ink reservoir or to said ink reservoir from said pressure compliant bladder in response to said pressure of ink in said volume of said chamber.

8. The cartridge according to claim 1 in which said pressure complaint body is a pressure compliant bladder having an interior continuously communicating with said ink reservoir so that ink flows to said pressure compliant bladder from said ink reservoir or to said ink reservoir from said pressure compliant bladder in response to said pressure of ink in said volume of said chamber.

9. An ink jet cartridge including:

a body having an ink reservoir therein, wherein ink in said reservoir produces pressure;

a chamber having a volume for containing ink, wherein ink in said volume of said chamber produces pressure, said chamber having a first passage for communicating said chamber with said ink reservoir and a second passage communicating said chamber with nozzles for ink to flow from said chamber to the nozzles;

flow control means for said first passage for controlling ink flow from said ink reservoir through said first passage into said chamber in response to said pressure of ink in said volume of said chamber;

and a pressure compliant body disposed in said chamber, said pressure complaint body being within said chamber and tending to contract to a minimum volume condition, said pressure compliant body continuously communicating with said ink reservoir to expand said body to reduce volume of said chamber to contain ink or to enable said body to return towards said minimum volume condition to increase volume of said chamber to contain ink in response to said pressure of ink in said volume of said chamber.

10. The cartridge according to claim 9 in which: said flow control means includes:

a valve body;

and means for continuously urging said valve body to a closed position to block said first passage to prevent ink flow from said ink reservoir through said first passage into said chamber;

and said valve body supports said pressure compliant body.

11. The cartridge according to claim 10 in which:

said pressure compliant body is a pressure compliant bladder having the capability of continuously returning to said minimum volume condition;

and said valve body has a passage communicating the interior of said pressure compliant bladder with said ink reservoir so that ink flows to said pressure compliant bladder from said ink reservoir or to said ink reservoir from said pressure compliant bladder in response to said pressure of ink in said volume of said chamber.

12. The carriage according to claim 11 in which said means for continuously urging of said flow control means comprises a spring.

13. The carriage according to claim 10 in which said means for continuously urging of said flow control means comprises a spring.

14. The cartridge according to claim 9 in which said flow control means supports said pressure compliant body.

15. The cartridge according to claim 14 in which said pressure compliant body is a pressure compliant bladder having an interior continuously communicating with said ink reservoir so that ink flows to said pressure compliant bladder from said ink reservoir or to said ink reservoir from said pressure compliant bladder in response to said pressure of ink in said volume of said chamber.

16. The cartridge according to claim 9 in which said pressure compliant body includes a pressure compliant bladder having an interior continuously communicating with said ink reservoir so that ink flows to said pressure compliant bladder from said ink reservoir or to said ink reservoir from said pressure compliant bladder in response to said pressure of ink in said volume of said chamber.

* * * * *